Dec. 2, 1941.  F. D. CHAPMAN  2,264,361
FRUIT JUICE EXTRACTION
Filed July 24, 1939
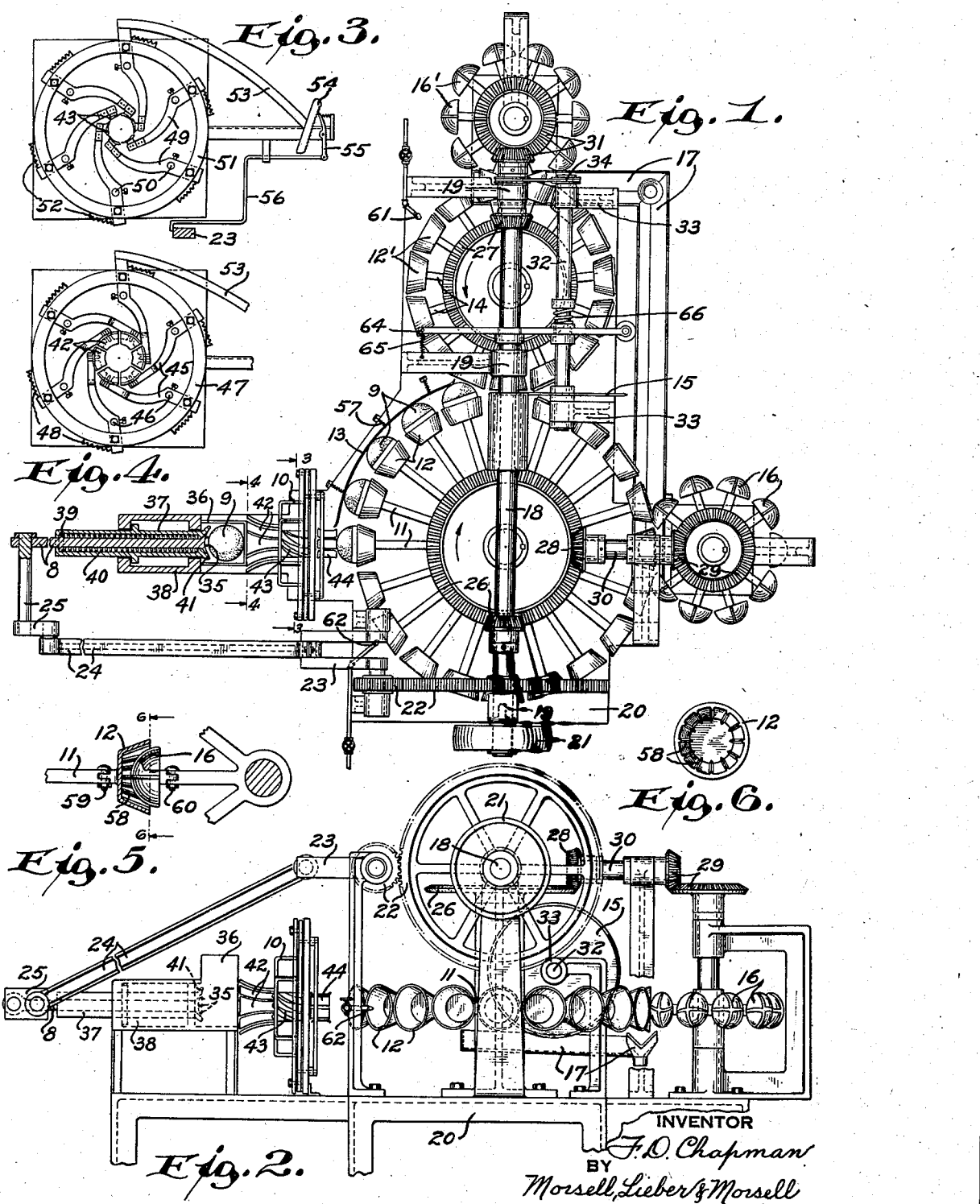
INVENTOR
F. D. Chapman
BY
Morsell, Lieber & Morsell
ATTORNEYS.

Patented Dec. 2, 1941

2,264,361

UNITED STATES PATENT OFFICE 2,264,361

FRUIT JUICE EXTRACTION

Frank D. Chapman, Berlin, Wis.

Application July 24, 1939, Serial No. 286,141

12 Claims. (Cl. 100—47)

This invention relates in general to improvements in the art of extracting juice from fruit or the like, and relates more specifically to improvements in the construction and operation of apparatus for removing the juice from fruit objects such as oranges, lemons, grape-fruit or similar fruit bodies.

Generally defined, an object of my invention is to provide improvements in fruit juice extraction whereby the juice may be removed without contamination thereof by peeling or skin flavors.

Many attempts have heretofore been made to rapidly and effectively extract the juice from successive fruit objects or bodies in order to permit marketing of the juice alone rather than the whole fruits. While it is a relatively simple matter to thus extract the juice from many fruits and vegetables, it is more difficult to remove the juice from citrous fruits such as oranges, lemons and grape-fruit because of the fact that the skins or peelings of such fruits contain oils and flavoring substances which are detrimental to the palatability of the juice, if permitted to mix therewith. The prior methods and apparatus for effecting extraction of citrous fruit juices, have not avoided such mixture of the contaminating substances with the juice, and the product produced by these methods has therefore been relatively uncommercial and unsatisfactory.

It is therefore a more specific object of my present invention to provide improved equipment for removing juice from citrous fruit, in a rapid and efficient manner and without contaminating the juice with peeling flavors.

Another specific object of the invention is to provide an improved simple and effective apparatus for automatically removing the juice from a succession of fruit objects.

A further specific object of my invention is to provide a durable and compact fruit juice extracting mechanism of large capacity, which is adapted to effectively handle fruit objects or bodies of various sizes.

These and other specific objects and advantages will be apparent from the following detailed description.

A clear conception of the several features constituting the present invention, and of the construction and operation of one type of mechanism for carrying on commercial exploitation thereof, may be had by referring to the drawing accompanying and forming a part of this specification wherein like reference characters designate the same or similar parts in the various views.

Fig. 1 is a diagrammatic top view of a machine for carrying on my new mode of extracting fruit juice;

Fig. 2 is a diagrammatic side elevation of the machine illustrated in Fig. 1;

Fig. 3 is an enlarged part sectional top view of a cooperating set of the carrier cups and reamers;

Fig. 4 is a transverse vertical section through the initial fruit feeder guides, taken along the line 4—4 of Fig. 1;

Fig. 5 is an enlarged part sectional fragmentary view of one of the conveyor cups and reamers; and Fig. 6 is an inside view of one of the conveyor cups.

While the invention has been shown as being embodied in a rather diagrammatic manner in a semi-automatic machine adapted to carry on my improvement, it is not the intention to thereby unnecessarily restrict the scope since my invention may be exploited by machines of different detailed construction than that specifically shown.

Referring to the drawing, the improved citrous fruit juice extractor shown therein comprises in general a reciprocal plunger 8 for intermittently feeding the successive fruit bodies or objects 9 such as oranges along a definite path; guiding and cutting mechanism 10 for removing a ring of outer or partial peeling from each of the objects 9 passing therethrough; a primary member or rotor 11 having an annular series of carrier cups 12 cooperable with a guide wall 13 to conduct the ring peeled objects 9 away from the mechanism 10 towards the severing zone; a secondary member or rotor 14 having an annular series of carrier cups 12' cooperable with the cups 12 to maintain the fruit objects 9 in position while being severed; a rotary saw or severing blade 15 for cutting each of the successive objects 9 approximately in half; annular series of primary and secondary juice expressing plungers or reamers 16, 16' cooperable with the cups 12, 12' respectively, to remove the juice from the successive half objects carried by the latter away from the severing zone; troughs 17 for collecting and conducting the removed juice from the machine; and driving mechanism for releasing the ring peeler and for operating the juice extraction rotors.

As specifically illustrated, the driving mechanism consists primarily of a main drive shaft 18 mounted in bearings 19 carried by the base 20 of the machine and having a pulley 21 secured to one end thereof; intermeshing spur gears 22 drivingly connecting the shaft 18 with a crankshaft 23 which is connected through a connecting rod 24 and crosshead 25 with the feed plunger 8; bevel gearing 26 drivingly connecting the shaft 18 and the primary rotor 11; bevel gearing 27 drivingly interconnecting the shaft 18 and the secondary rotor 14; bevel gearing 28, 29 and a counter shaft 30 for imparting motion from the rotor 11 to the series of reamers 16; bevel gearing 31 for imparting motion from the rotor 14 to the annular series of reamers 16'; and a shaft 32 journalled in bearings 33 mounted upon the base 20 and carrying the severing blade 15 near one end while its opposite end is drivingly connected to the main shaft 18 by means of a belt drive 34.

The mechanism for feeding the fruit objects 9 in succession toward the ring peeler or grinding and cutting mechanism 10, comprises the horizontally reciprocal plunger 8 which is provided with end projections or points 35 adapted to penetrate the skins of the objects 9 which are deposited in succession into the feed hopper 36, and thus prevent rotation of the spherical bodies while ring peeling is being effected. The plunger 8 may be slidably confined within a tubular casing 37 which is likewise slidably confined in a fixed frame 38, and the plunger 8 has an integral collar 39 between which and the opposite end of the casing 37, a compression spring 40 is confined. With this assemblage, the casing 37 will normally move with the plunger 8, until the end flange 41 thereof engages the initial guide located directly in advance of the ring peeling knives, whereupon the movement of the casing 37 may be arrested without preventing the plunger 8 from moving further toward the cups 12.

The guiding and cutting mechanism 10 is quite similar in construction to the ordinary corn cutter for removing the corn kernels from the cob, and consists of a radially expansible annular tapered initial guide 42, an annular series of radially adjustable knives 43 disposed concentric with the axis of annularity of the guide 42, and a final guide 44 also disposed concentric with said axis and located between the knives 43 and the cups 12 of the rotor 11, see Figs. 1, 3 and 4. The several segments of the expansible guide 42 are suspended upon pivoted arms 45 mounted upon pivot pins 46 and connected to a common ring 47, so that when the guide 42 is expanded or diminished in diameter, all of the segments will move in unison away from or toward the axis of the plunger 8. Springs 48 coacting with the outer ends of the lever arms 45, or a single spring coacting with the ring 47 tend to keep the guide 42 contracted at all times, see Fig. 4. The several cutter segments or knives 43 are likewise carried by pivotally suspended lever arms 49 mounted on fixed pivots 50 and connected to a common ring 51, so that when the knives 43 move radially, they likewise move in unison. The two rings 47, 51 are preferably interconnected so that the guide segments and the knives also move in unison toward and away from the common axis of movement of the plunger 8, and the knife arms 49 may also be provided with springs 52 for urging the knives 43 inwardly, see Fig. 3. The rings 47, 51 are connected by arms 53 to a toothed rack 54 with which a spring pressed pawl 55 is coöperable to hold the guide 42 and knives 43 in expanded position during cutting, and the pawl 55 is releasable by the crank 23 acting upon a release rod 56 as illustrated diagrammatically in Fig. 3, as the crank revolves. The final guide 44 may be formed of segments connected to and movable with the knives 43, and the plunger 8 is movable centrally through the guides 42, 44 and knife ring, so as to push the successive objects 9 past the knives 43 and into the successive pockets or cups 12 as these objects are ring peeled by the knives.

The guide plate 13 may be resiliently suspended from the frame 20 by springs 57, and the conveying pockets or cups 12, 12' are preferably provided with internal ribs 58 in order to grip and retain the objects 9, see Fig. 6. The cups 12, 12' are also preferably detachably secured to the rotors 11, 14 by means of bolts 59 or the like; and the reamers 16, 16' are likewise detachably secured to their driving rotors by means of similar bolts 60, see Fig. 5. While the conveyor cups 12, 12' may also be provided with means for positively removing the reamed objects or peelings therefrom, these reamed peelings will be removed or withdrawn from the cups by the reamers 16, 16' after the juice has been extracted; but it is preferable to provide nozzles 61, 62 for directing jets of cleansing fluid into the cups 12, 12' after the objects have been removed therefrom, in order to remove contaminating skin oils or the like. The juice removing troughs 17 should preferably be so positioned that the liquid from the nozzles 61, 62 and the juice dropping from the cutter blade 15 will not enter these troughs. The cutter blade 15 may be provided either with a peripheral knife edge or with relatively fine saw teeth, and the blade supporting shaft 32 may be provided with blade positioning mechanism consisting of a lever 64 pivotally suspended at one end from the frame 20 and having its opposite end connected to a spring 65, while the medial position thereof is engaged by a stronger spring 66 embracing the shaft 32. The blade 15 will thus be constantly resiliently urged toward the adjacent bearing 33 and will be maintained in a plane midway between the pockets or cups 12, 12' at the place of closest approach of these cups.

During normal operation of my improved fruit juice extracting mechanism, power is applied to the pulley 21 and the main shaft 18 is rotating constantly. This constant rotation of the shaft 18 is transmitted to the rotors 11, 14 and to the reamers 16, 16', and causes the cups 12, 12' and the reamers to revolve. Motion is simultaneously transmitted through the gearing 22, crank shaft, connecting rod 24 and crosshead 25 to the feed plunger 8, causing this plunger to constantly reciprocate in a generally horizontal direction. As the successive fruit bodies or objects 9 are deposited into the hopper 36, they are urged in succession through the guide 42 and past the knives 43, thereby removing an annular ring of peeling from each of the objects. The ring peeled objects are then forced by the plunger through the guide 44 and into the successive pockets or cups 12. The cups 12 transport the successive ring peeled objects 9 toward the severing zone, where these objects are cut in two along a substantially central plane at the ring peeled area thereof, by the severing knife 15. The halved objects are subsequently transported by the cups 12, 12' respectively, into the zone of action of the reamer 16, 16' respectively, where the juice is removed and is deposited by gravity into the troughs 17. The residual peelings are subsequently removed from the cups 12, 12' by the reamers 16, 16', and are deposited by gravity from the mechanism. The empty cups 12, 12' are subsequently conveyed past the nozzles 61, 62 where they are thoroughly cleansed preparatory to the introduction of subsequent fruit objects.

In this manner the successive objects 9 are automatically ring peeled, halved and have the juice effectively removed therefrom, without contaminating the juice with oils from the peelings or skins. By virtue of the fact that the objects are first ring peeled, and that they are subsequently severed at the peeled portions, no peeling oils can enter the juice which is subsequently extracted, and care has been taken throughout the operation not to permit contamination of the juice by these oils. While the feeding of objects 9 to the machine has been described as being effected manually, this feeding can obviously be accomplished automatically and the expansible and contractible gauges 42, 44 cooperting with the likewise expansible and contractible knife series, will cause the parts to operate effectvely on objects 9 of various diameter. The tubular casing 37 cooperating with the feed plunger 8, will cause effective delivery of the objects 9 to the initial guide 42, while permitting the plunger 8 to carry the objects past the knives 43 and through the final guide 44. While the machine for carrying on the improvement, has been shown in rather diagrammatical form, and some refinements may be desirable in the actual construction thereof, it should be apparent that this machine is capable of performing the several steps involved in the improved mode of extraction. It is also to be noted, that the ratchet mechanism comprising the toothed segment or rack 54 and the pawl 55, functions to positively hold the knives 43 open or in separated condition, until the successive ring peeled objects 9 have passed through the guides 44, whereupon the pawl 55 is released by the crank 23 and the knives 43 are again returned to the position shown in Fig. 3. Another important feature of my present improvement is the fact that only the outer portion of the skin which contains the contaminating matter, need be removed, and it is not necessary or desirable to remove the entire skin or peeling at the ring peeled zones. With my invention it is desirable to remove as little of the peeling as necessary to eliminate oil cells at the zone of severance, so that enough peeling devoid of oil cells is left at this zone to retain the fruit in shape, and the plungers or reamers will not tear the remaining peeling to pieces during final extraction.

It should be understood that it is not desired to limit the present invention to the exact details of construction of the machine, shown and described herein, for various modifications within the scope of the claims may occur to persons skilled in the art.

I claim:

1. In combination, means for feeding approximately spherical fruit objects in succession along a definite path, means for removing a circumscribing ring of peeling from each of the successive objects, a rotor having pockets adapted to receive the unpeeled portion of each of the successive objects on one side of the peeled ring, another rotor having pockets adapted to receive the other unpeeled portion of each object, means for severing each object at the peeled area only while held by both of said rotors, and means for extracting the juice from the severed areas of said objects.

2. In combination, a cutter for removing an annular strip of peeling from each of a succession of approximately spherical fruit objects passing the same, a reciprocal plunger for feeding the objects in succession past said cutter, a rotor formed to receive the successive objects delivered from said cutter, another rotor adapted to engage the successive objects being conveyed by said receiving rotor, means for severing the successive objects at the peeled area only while engaged by both rotors at the unpeeled areas, and means for extracting the juice from the half-objects carried by said rotors.

3. In combination, means for extracting juice from successive fruit objects, mechanism for advancing the objects in succession along an axis and toward said extracting means, a cutter for ring peeling the successive objects, said cutter having knives movable toward and away from said axis of advancement of the objects past the cutter and toward said extracting means to conform with objects of various diameters, and means for retaining said knives in spread condition until after the objects have been delivered from the zone of cutting to said extracting means.

4. In combination, juice extracting means, mechanism for feeding the successive objects along an axis toward said extracting means, a ring peeling cutter having knives movable toward and away from said axis of feeding of successive fruit objects toward said extracting means, and means for holding said knives in spread formation after each object has been ring peeled and while said feeding mechanism is still effective.

5. In combination, juice extracting means, mechanism for feeding the successive objects along an axis toward said extracting means, a ring peeling cutter having knives movable toward and away from said axis of feeding of successive fruit objects toward said extracting means, expansible means for centralizing each object with respect to said cutter, and means for holding said knives in spread formation after each object has been ring peeled and while said feeding mechanism is still effective.

6. In combination, means for extracting juice from successive fruit objects, a reciprocable plunger for feeding the successive objects along a rectilineal axis toward said extracting means, a cutter for ring peeling each of the successive objects, said cutter having peeling knives movable toward and away from said axis, and means for retaining said knives in spread condition after each object has been ring peeled and until the object has been delivered from the cutting zone by said plunger.

7. In combination, means for removing a circumscribing ring of peeling from each of a succession of fruit objects, a rotor having pockets adapted to receive the unpeeled portion of each of the successive objects on one side of the peeled ring, another rotor having complementary pockets adapted to receive the other unpeeled portion of each object, means for severing each object at the ring peeled area only while the object is being held by both of said rotors, and means for extracting juice from the objects at the severed areas.

8. In combination, a cutter for removing an annular strip of peeling from each of a succession of fruit objects passing the same, a rotor formed to receive the successive objects delivered from said cutter, another rotor adapted to engage the successive objects being transported by said receiving rotor, means for severing the successive objects at the peeled area only while each object is engaged by both rotors at the unpeeled areas thereof, and means for extracting the juice from the half-objects.

9. In combination, means for removing an approximately central ring of peeling from each of a succession of round fruit objects advancing along a definite path, a rotor formed to receive the successive objects delivered from said peeling means, another rotor adapted to engage each object being transported by said receiving rotor, means for severing each object at the peeled area only thereof while the object is engaged by both rotors at the unpeeled areas thereof, and means for extracting juice from the half-objects at the severed areas.

10. In combination, means for ring peeling each of a succession of round fruit objects advancing along a definite path, an annular series of moving pockets formed to receive the successive ring peeled objects delivered from said peeling means, another annular series of moving pockets adapted to engage each object being transported by said receiving pockets, means for severing each object at the peeled area only thereof while the object is engaged by pockets of both of said series at the unpeeled areas thereof, and means for extracting juice from the severed areas of the half-objects.

11. In combination, means for centrally ring peeling each of a succession of round objects advancing along a definite path, a series of advancing pockets formed to receive the successive ring peeled objects delivered from said peeling means, another series of advancing pockets adapted to engage each object being transported by said receiving pockets, means for severing each object at the peeled area only thereof while the object is being held by pockets of both series at the unpeeled areas thereof, and means for extracting juice from the severed areas of the half-objects.

12. In combination, means for centrally ring peeling each of a succession of round objects advancing along a definite path, a series of advancing object carriers formed to receive the successive ring peeled objects delivered from said peeling means, another series of advancing carriers adapted to engage each object being transported by said receiving carriers, means for severing each object at the peeled area only thereof while the object is being held by carriers of both series, and means for extracting juice from the severed areas of the half-objects.

FRANK D. CHAPMAN.